US011784532B2

(12) United States Patent
Makino et al.

(10) Patent No.: US 11,784,532 B2
(45) Date of Patent: Oct. 10, 2023

(54) MOTOR

(71) Applicant: NIDEC CORPORATION, Kyoto (JP)

(72) Inventors: Takayuki Makino, Kyoto (JP);
Tsubasa Hirayama, Kyoto (JP);
Masato Aono, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 47 days.

(21) Appl. No.: 17/676,820

(22) Filed: Feb. 22, 2022

(65) Prior Publication Data
US 2022/0271603 A1 Aug. 25, 2022

(30) Foreign Application Priority Data

Feb. 25, 2021 (JP) .................................. 2021-028596

(51) Int. Cl.
*H02K 5/10* (2006.01)
*H02K 7/00* (2006.01)
*H02K 9/19* (2006.01)
*H02K 11/40* (2016.01)
*H02K 7/08* (2006.01)

(52) U.S. Cl.
CPC ............... *H02K 5/10* (2013.01); *H02K 7/003* (2013.01); *H02K 7/083* (2013.01); *H02K 9/19* (2013.01); *H02K 11/40* (2016.01); *H02K 2205/09* (2013.01)

(58) Field of Classification Search
CPC .... H02K 11/40; H02K 2205/09; H02K 7/003; H02K 5/10; H02K 7/116; H02K 7/08; H02K 5/225; H05F 3/04; H05F 3/02; H01T 19/00
USPC ............................................ 310/54, 71, 40 R
See application file for complete search history.

(56) References Cited

U.S. PATENT DOCUMENTS 11,121,608 B2    9/2021  Huber et al.
2010/0127585 A1* 5/2010  Fee ........................ H02K 11/40
                                                310/71

FOREIGN PATENT DOCUMENTS

CN      108173386 A    6/2018
JP      2019192491 A   10/2019

* cited by examiner

*Primary Examiner* — Terrance L Kenerly
(74) *Attorney, Agent, or Firm* — HAUPTMAN HAM, LLP

(57) ABSTRACT

A shaft of a motor includes a first shaft having a tubular shape extending in an axial direction, a lid portion disposed in one axial end portion of the first shaft, a second shaft extending on one axial side from the lid portion, a first shaft through hole penetrating the first shaft in a radial direction, and a second shaft through hole communicating with an inside of the first shaft and an external space of the shaft. The lid portion and the second shaft have conductivity. The second shaft through hole is disposed on one axial side with respect to the first shaft through hole. The second shaft is in contact with an electrical discharging device that electrically connects the shaft and the housing of the motor.

16 Claims, 18 Drawing Sheets

MOTOR

CROSS-REFERENCE TO RELATED APPLICATIONS

The present invention claims priority under 35 U.S.C. § 119 to Japanese Patent Application No. 2021-028596 filed on Feb. 25, 2021, the entire content of which is incorporated herein by reference.

FIELD OF THE INVENTION

The present invention relates to a motor.

BACKGROUND

Conventionally, a ground device that grounds an output shaft of a motor is known. For example, a ground member of the ground device contacts the axial center of the end face of the output shaft from the axial direction.

However, in the case of cooling the motor by causing the refrigerant inside the hollow output shaft to flow out from the through hole in the radial direction by rotation, the refrigerant is drawn into the output shaft from the other axial end portion due to a pressure difference by taking in the refrigerant from the axial end portion of the output shaft. Therefore, in the above-described ground device, it is difficult to perform cooling using the hollow output shaft as described above.

SUMMARY

An exemplary motor of the present invention includes a shaft, a rotor, a stator, a bearing, a housing, and an electrical discharging device. The shaft includes a first shaft having a tubular shape extending in the axial direction. The rotor is supported by the first shaft and is rotatable together with the shaft. The stator is disposed radially outward of the rotor. The bearing rotatably supports the first shaft. The housing accommodates the rotor, the stator, and the bearing. The electrical discharging device electrically connects the shaft and the housing. The shaft further includes a lid portion, a second shaft, a first shaft through hole, and a second shaft through hole. The lid portion is disposed in one axial end portion of the first shaft. The second shaft extends on one axial side from the lid portion. The first shaft through hole penetrates the first shaft in the radial direction. The second shaft through hole communicates with the inside of the first shaft and an external space of the shaft. The lid portion and the second shaft have conductivity. The second shaft through hole is disposed on one axial side with respect to the first shaft through hole. The second shaft is in contact with the electrical discharging device.

The above and other elements, features, steps, characteristics and advantages of the present disclosure will become more apparent from the following detailed description of the preferred embodiments with reference to the attached drawings.

DETAILED DESCRIPTION

Hereinafter, exemplary embodiments will be described with reference to the drawings.

Figure 1:
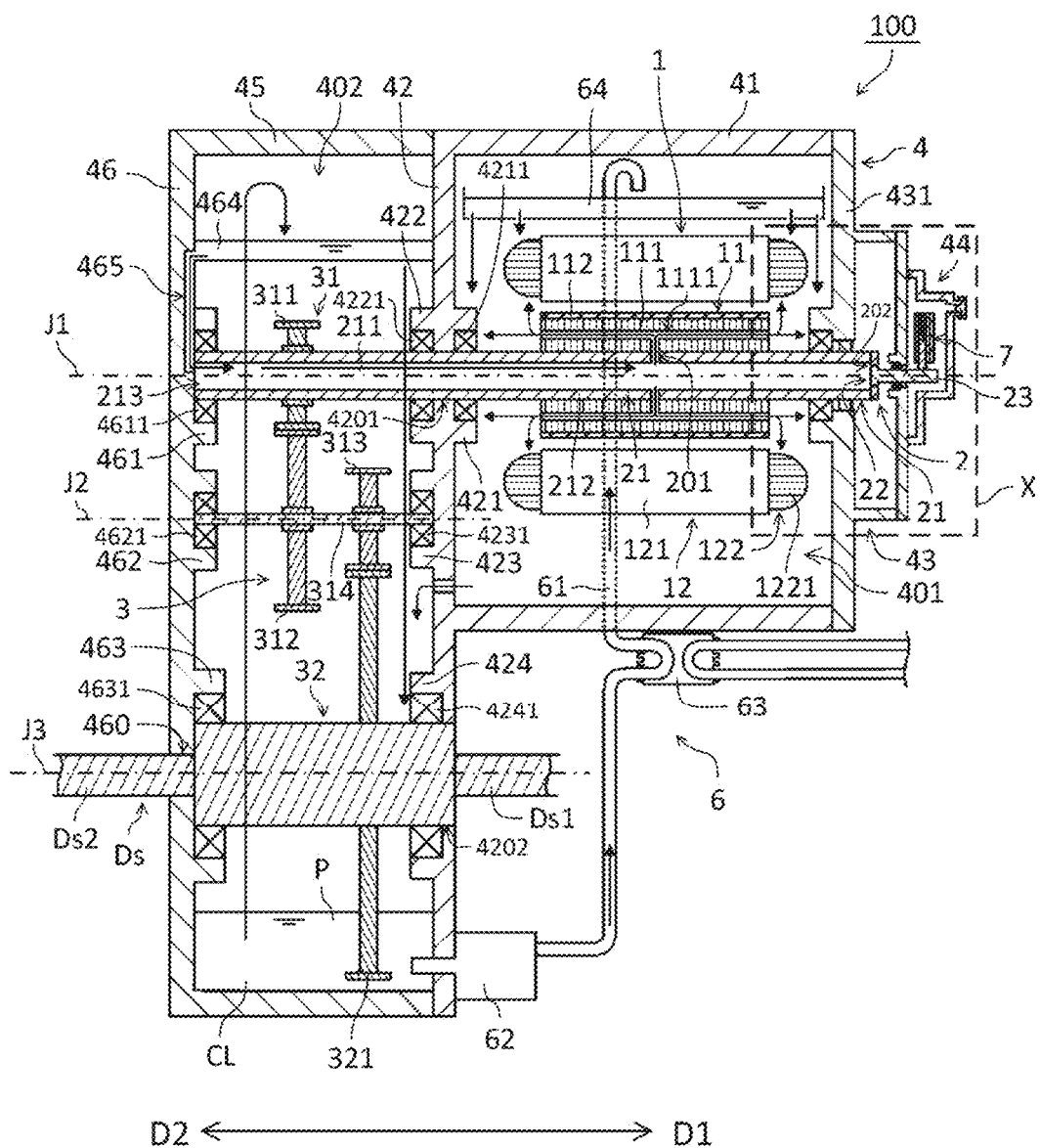
FIG. 1 is a conceptual diagram illustrating a configuration example of a motor.

In the present specification, a direction parallel to a first rotation axis J1 of a motor 100 is referred to as an "axial direction" of a motor unit 1. In the axial direction, as illustrated in FIG. 1, a motor unit 1 side is defined as one axial side D1, and a power transmission device 3 side is defined as the other axial side D2. In addition, a radial direction orthogonal to a predetermined axis is simply referred to as a "radial direction", and a circumferential direction around the predetermined axis is simply referred to as a "circumferential direction". The "direction parallel to the rotation axis" described in the present specification includes not only a case where the direction is completely parallel to the rotation axis, but also a case where the direction is substantially parallel to the rotation axis. Then, "extending along" a predetermined direction or a plane includes not only a case of extending strictly in a predetermined direction but also a case of extending in a direction inclined within a range of less than 45° with respect to the exact direction.

Figure 2:
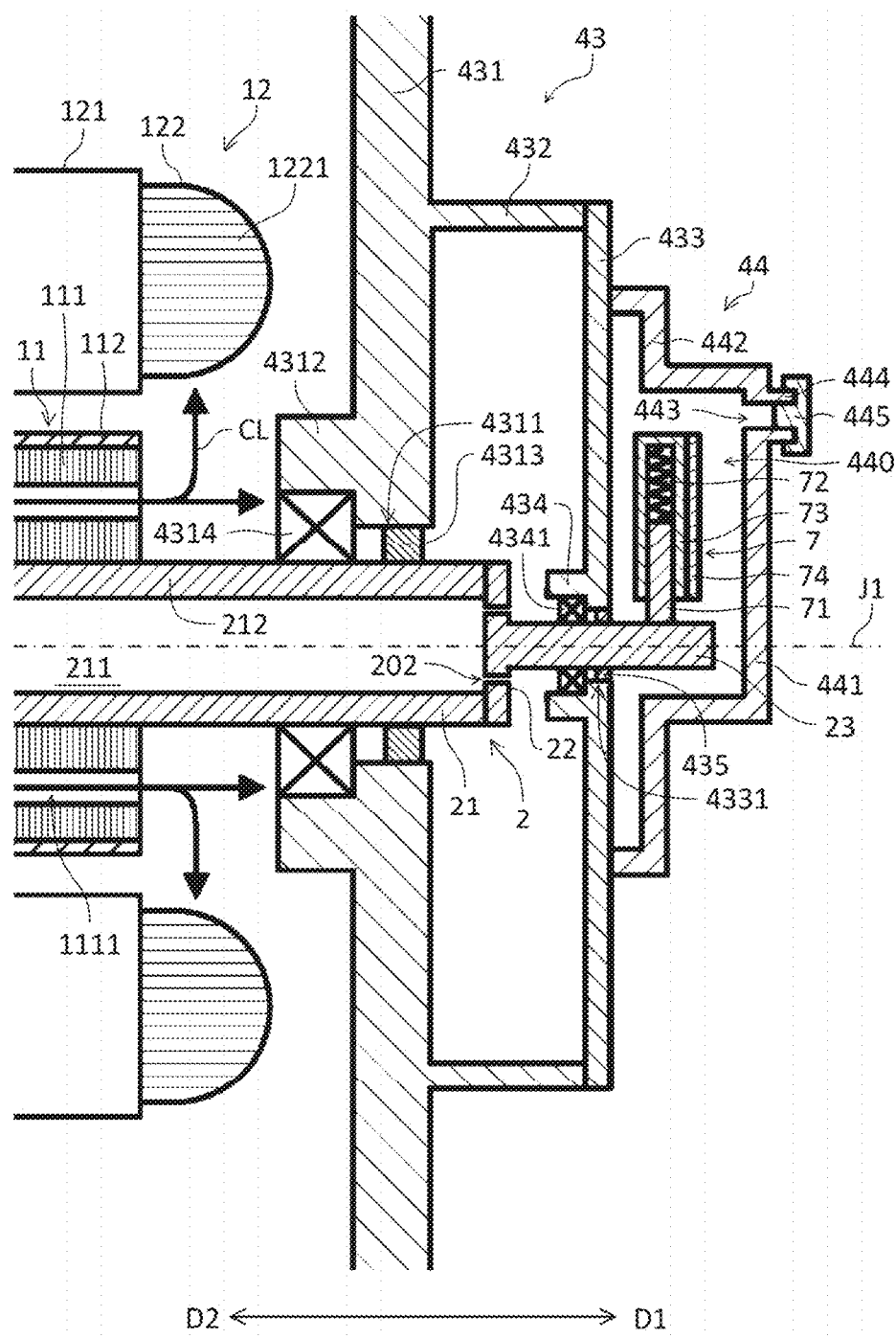
FIG. 2 is a conceptual diagram illustrating an enlarged configuration example of a main part of the motor.
Figure 3:
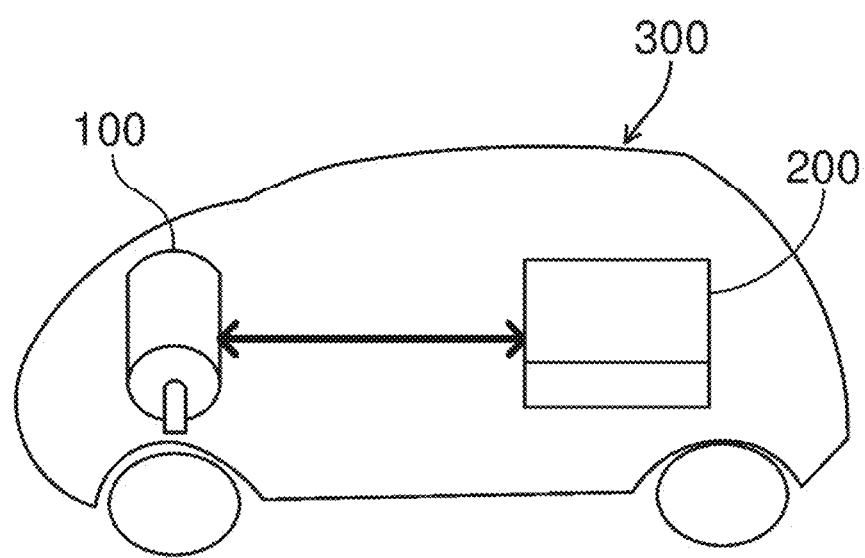
FIG. 3 is a schematic diagram illustrating an example of a vehicle on which the motor is mounted.

FIG. 1 is a conceptual diagram illustrating a configuration example of the motor 100. FIG. 2 is a conceptual diagram illustrating an enlarged configuration example of a main part of the motor 100. FIG. 3 is a schematic diagram illustrating an example of a vehicle 300 including the motor 100. Note that FIGS. 1 and 2 are merely the conceptual diagrams, and a layout and a dimension of each unit are not necessarily identical to a layout and a dimension of each unit of the actual motor 100. FIG. 2 is an enlarged view of a portion X encircled by a broken line in FIG. 1. Note that FIG. 3 conceptually illustrates the vehicle 300.

As illustrated in FIG. 3, in the present embodiment, the motor 100 is mounted on the vehicle 300 such as a hybrid vehicle (HV), a plug-in hybrid vehicle (PHV), and an electric vehicle (EV) in which at least the motor is used as a power source. The motor 100 is used as the power source of the above-described vehicle 300. The vehicle 300 includes the motor 100 and a battery 200. The battery 200 stores electric power to be supplied to the motor 100. In the example of the vehicle 300, the motor 100 drives the right and left front wheels. Note that the motor 100 only has to drive at least one of the wheels.

As illustrated in FIG. 1, the motor 100 includes a motor unit 1, a shaft 2, a power transmission device 3, a housing 4, and a liquid circulation portion 6. The shaft 2 extends in an axial direction along the first rotation axis J1. The shaft 2 is rotatable about the first rotation axis J1. The housing 4 accommodates the motor unit 1, the shaft 2, and the power transmission device 3. For example, the housing 4 accommodates a rotor 11, a stator 12, bearings 4211 and 4314, and the like of the motor unit 1 described later.

The motor 100 further includes an electrical discharging device 7 having a conductive member 71. The electrical discharging device 7 electrically connects the shaft 2 and the housing 4. The electrical discharging device 7 is fixed to the housing 4 and is in contact with the shaft 2. As illustrated in FIG. 2, the electrical discharging device 7 of the present embodiment further includes an elastic member 72, a holding member 73, and a fixing member 74.

The conductive member 71 is formed using a material having conductivity. A tip of the conductive member 71 is in contact with a second shaft 23 of the shaft 2 described later. The conductive member 71 is a molded body in the present embodiment, but is not limited to this example, and may have a brush shape. As the material of the conductive member 71, a material having good slidability is preferably used, and a material having a low friction coefficient is more preferably used. As a material of the conductive member 71, for example, a composite resin containing a conductive filler such as carbon fiber or metal can be adopted.

The elastic member 72 is accommodated inside the holding member 73 in a compressed state. Due to the elasticity, the elastic member 72 pushes the conductive member 71 toward the second shaft 23. In the present embodiment, a spring coil is used as the elastic member 72, but the present invention is not limited to this example, and a member in another form such as a leaf spring or rubber may be used.

The holding member 73 has a bottomed tubular shape, and accommodates a part of the conductive member 71 and the elastic member 72 therein. The holding member 73 holds the conductive member 71. Specifically, the holding member 73 holds the end portion of the conductive member 71 on the elastic member 72 side so as to be movable in the direction in which the holding member 73 extends. The holding member 73 holds the elastic member 72 so as to be stretchable in the direction in which the holding member 73 extends.

The fixing member 74 fixes the electrical discharging device 7 to the housing 4. In the present embodiment, the fixing member 74 is attached to the holding member 73. At least one fixing member 74 is fixed to a plate portion 433 described later (for example, see FIG. 4A described later). However, the present invention is not limited to this example, and at least one fixing member 74 may be fixed to a cover member 44 described later. That is, the fixing member 74 fixes the holding member 73 to at least one of the plate portion 433 and the cover member 44.

Further, the fixing member 74 has conductivity and is electrically connected to the conductive member 71. When the fixing member 74 is fixed to the plate portion 433 or the cover member 44 having conductivity, the conductive member 71 is electrically connected to the housing 4.

Next, the motor unit 1 will be described with reference to FIGS. 1 and 2. The motor unit 1 is a DC brushless motor. The motor unit 1 is a drive source of the motor 100, and is driven by power from an inverter (not illustrated). That is, the motor unit 1 is an inner rotor type motor in which the rotor 11 is rotatably disposed inward of the stator 12. As illustrated in FIG. 1, the motor unit 1 includes the rotor 11 and the stator 12.

The rotor 11 is supported to the shaft 2. The motor 100 includes the rotor 11. The rotor 11 is rotatable together with the shaft 2. Specifically, the rotor 11 is supported by a first shaft 21 described later. The rotor 11 rotates when electric power is supplied from a power source unit (not illustrated) of the motor 100 to the stator 12. The rotor 11 includes a rotor core 111 and a magnet 112. The rotor core 111 is formed by stacking electromagnetic steel plates having a thin plate shape, for example. The rotor core 111 is a cylindrical body extending along the axial direction, and is fixed to the radially outer surface of the first shaft 21. A plurality of magnets 112 are fixed to the rotor core 111. The plurality of magnets 112 are aligned along the circumferential direction with the magnetic poles arranged alternately.

The rotor core 111 has a rotor through hole 1111. The rotor through hole 1111 penetrates the rotor core 111 in the axial direction and is connected to a first shaft through hole 201. The rotor through hole 1111 is used as a flow path of the lubricant CL that also functions as a refrigerant. When the rotor 11 rotates, the lubricant CL flowing through a hollow portion 211 of the first shaft 21 can flow into the rotor through hole 1111 via the first shaft through hole 201. The lubricant CL having flowed into the rotor through hole 1111 can flow out from both axial ends of the rotor through hole 1111. The flowed lubricant CL flies toward the stator 12 and cools, for example, a coil portion 122 (particularly, a coil end 1221). In addition, the flowed lubricant CL flies toward the bearings 4211 and 4314 that rotatably support the first shaft 21, and the like to lubricate and cool the bearings 4211 and 4314.

The stator 12 is disposed radially outward of the rotor 11. The motor 100 includes the stator 12. The stator 12 includes a stator core 121 and the coil portion 122. It is interposed between the stator core 121 and the coil portion 122. The stator 12 is held by a first housing tubular portion 41 described later. The stator core 121 has a plurality of magnetic pole teeth (not illustrated) extending radially inward from an inner peripheral surface of an annular yoke. The coil portion 122 is formed by winding a conductive wire around magnetic pole teeth via an insulator (not illustrated). The coil portion 122 includes the coil end 1221 protruding from the axial end surface of the stator core 121.

As illustrated in FIG. 1, the shaft 2 is rotatably supported by the housing 4 via bearings 4211, 4221, 4314, and 4611 described later. That is, the motor 100 includes the bearings 4211, 4221, 4314, and 4611. The bearings 4211, 4221, 4314, and 4611 rotatably support the first shaft 21.

The shaft 2 includes the first shaft 21. As described above, the motor 100 includes the shaft 2. The first shaft 21 has an axially extending tubular shape. The refrigerant flows inside the first shaft 21. The motor 100 further includes the refrigerant. In the present embodiment, the refrigerant is the lubricant CL. According to the rotation of the shaft 2, the refrigerant flowing inside the first shaft 21 can be supplied to the stator 12, the bearings 4211 and 4314, and the like through the first shaft through hole 201 described later. Therefore, the stator 12 (particularly, the coil end 1221 of the coil portion 122), the bearings 4211 and 4314, and the like can be cooled by the refrigerant.

The first shaft 21 includes a hollow portion 211, a shaft tubular portion 212, and an inlet 213. The shaft tubular portion 212 extends in the axial direction along the first rotation axis J1. The hollow portion 211 is disposed inside the shaft tubular portion 212. The inlet 213 is disposed on the other axial side D2 of the shaft tubular portion 212 and is connected to an oil passage 465 of a gear lid portion 46 described later. The lubricant CL described later flows into the hollow portion 211 from the oil passage 465 through the inlet 213.

Note that the first shaft 21 may be dividable at an intermediate portion in the axial direction. When the first shaft 21 is dividable, the divided first shafts 21 can adopt a screw coupling using a male screw and a female screw, for example. Alternatively, the divided power shafts may be joined by a fixing method such as press-fitting or welding. When the fixing method such as press-fitting or welding is adopted, serrations combining recesses and protrusions extending in the axial direction may be adopted. With such a configuration, it is possible to reliably transmit the rotation.

The shaft 2 further includes a lid portion 22, a second shaft 23, a first shaft through hole 201, and a second shaft through hole 202. The lid portion 22 is disposed in one axial end portion of the first shaft 21. The second shaft 23 extends from the lid portion 22 on the one axial side D1. The first shaft through hole 201 penetrates the first shaft 21 in the radial direction. The second shaft through hole 202 communicates with the inside of the first shaft 21 and the external space of the shaft 2. The second shaft through hole 202 is disposed on the one axial side D1 with respect to the first shaft through hole 201. The first shaft 21, the lid portion 22, and the second shaft 23 have conductivity, and are made of metal in the present embodiment. The second shaft 23 is in contact with the electrical discharging device 7.

Since the second shaft through hole 202 disposed on the one axial side D1 with respect to the first shaft through hole 201 is provided in the shaft 2, the lubricant CL to be a refrigerant can be drawn from the other axial side D2 of the first shaft 21 to the inside due to the pressure difference by taking in the lubricant CL from the second shaft through hole 202. Therefore, the lubricant CL inside the first shaft 21 having a tubular shape can be caused to flow out from the first shaft through hole 201 by rotation to cool the motor unit 1 (particularly, the coil portion 122 of the stator 12). Further, when the electrical discharging device 7 is in contact with the second shaft 23, the shaft 2 is electrically connected to the housing 4. Therefore, the current generated by the potential fluctuation generated in the shaft 2 can be discharged to the housing 4 via the electrical discharging device 7. Therefore, it is possible to achieve both cooling of the motor unit 1 by the refrigerant (the lubricant CL in the present embodiment) in the first shaft 21 having a tubular shape and discharge of the shaft 2 by the electrical discharging device 7.

The second shaft 23 extends in the axial direction along the first rotation axis J1. The outer diameter of the second shaft 23 is smaller than the outer diameter of the first shaft 21.

Figure 4:
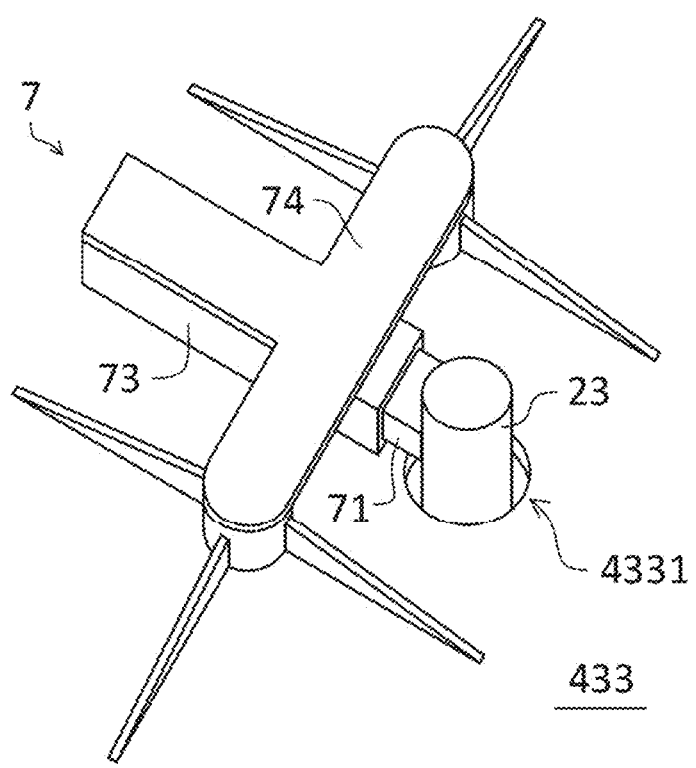
FIG. 4A is a diagram illustrating an example of contact between a second shaft and an electrical discharging device.
FIG. 4B is a diagram illustrating a first modification of the contact between the second shaft and the electrical discharging device.
FIG. 4C is a diagram illustrating a second modification of the contact between the second shaft and the electrical discharging device.
Figure 4:
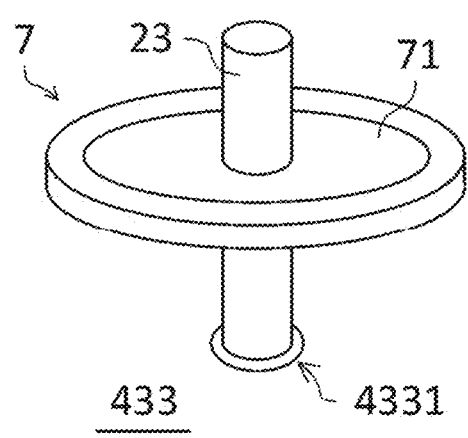
Figure 4:
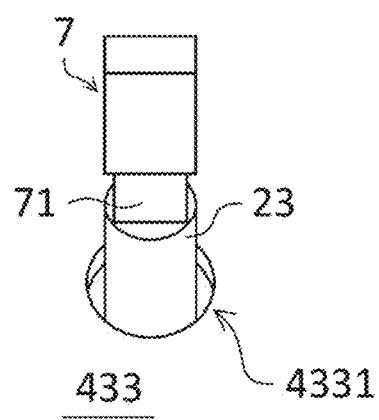

As described above, the electrical discharging device 7 is in contact with the second shaft 23. FIG. 4A is a diagram illustrating an example of contact between the second shaft 23 and the electrical discharging device 7. FIG. 4B is a diagram illustrating a first modification of the contact between the second shaft 23 and the electrical discharging device 7. FIG. 4C is a diagram illustrating a second modification of the contact between the second shaft 23 and the electrical discharging device 7. Preferably, as illustrated in FIGS. 4A and 4B, the electrical discharging device 7 is in contact with at least a partial region in the circumferential direction of the radially outer surface of the second shaft 23. For example, in the present embodiment, as illustrated in FIG. 4A, the electrical discharging device 7 is in contact with a partial region in the circumferential direction of the radially outer surface of the second shaft. On the other hand, as illustrated in FIG. 4B, the conductive member 71 of the electrical discharging device 7 may be in contact with the entire region in the circumferential direction of the outer surface in the direction of the second shaft 23. Since the electrical discharging device 7 is in contact with at least a partial region in the circumferential direction of the radially outer surface of the second shaft 23 having an outer diameter smaller than that of the first shaft 21, the sliding area of the electrical discharging device 7 with respect to the second shaft 23 per rotation of the shaft 2 can be further reduced. Accordingly, wear debris generated at a contact portion between the electrical discharging device 7 and the shaft 2 can be reduced. Note that the invention is not limited to this example, and the electrical discharging device 7 may be in contact with one axial end portion of the second shaft in the axial direction as illustrated in FIG. 4C.

The first shaft through hole 201 is disposed in the shaft tubular portion 212 and penetrates the shaft tubular portion 212 in the radial direction. When the shaft 2 rotates, the lubricant CL in the first shaft 21 flows out from the hollow portion 211 to the outside of the first shaft 21 through the first shaft through hole 201 by centrifugal force. In the present embodiment, as illustrated in FIG. 1, the first shaft through hole 201 is disposed on the other axial side D2 with respect to the one axial end portion of the rotor 11 and on the one axial side D1 with respect to the other axial end portion of the rotor 11, and is connected to the rotor through hole 1111 as described above.

Figure 5:
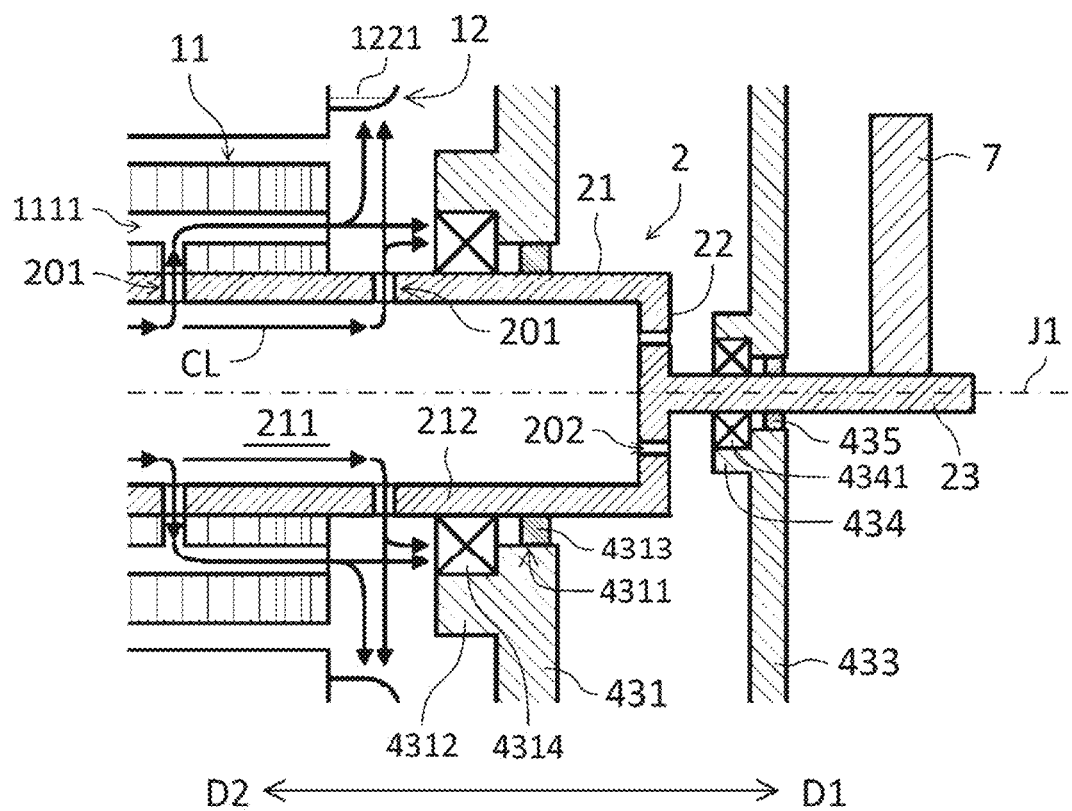
FIG. 5 is a diagram illustrating another arrangement example of first shaft through holes.

However, the present invention is not limited to the example of FIG. 1, and the first shaft through hole 201 may be disposed on the one axial side D1 with respect to the one axial end portion of the rotor 11, or may be disposed on the other axial side D2 with respect to the other axial end portion of the rotor 11. That is, at least some of the first shaft through holes 201 may be disposed in at least one of these positions. FIG. 5 is a diagram illustrating another arrangement example of the first shaft through holes 201. For example, as illustrated in FIG. 5, at least some of the first shaft through holes 201 may be disposed on the one axial side D1 with respect to the rotor 11 and may be disposed on the other axial side D2 with respect to the bearing 4314. At least some of the first shaft through holes 201 may be disposed on the other axial side D2 with respect to the rotor 11 and may be disposed on the one axial side D1 with respect to the bearing 4211. Thus, the refrigerant (that is, the lubricant CL) flowing inside the shaft tubular portion 212 can be caused to directly flow out toward the stator 12 and the bearings 4211 and 4314 through the first shaft through hole 201 arranged on the one axial side D1 or the other axial side D2 with respect to the rotor 11.

The second shaft through hole 202 is disposed in at least one of the lid portion 22 and the shaft tubular portion 212. In the present embodiment, the second shaft through hole 202 is disposed in the lid portion 22 and penetrates the lid portion 22 in the axial direction (see, for example, FIG. 2). Thus, air is more easily sucked into the first shaft 21 than when the second shaft through hole 202 is disposed in the first shaft 21. In addition, if the number of the second shaft through holes 202 functioning as the intake ports is plural, the amount of intake air into the first shaft 21 and the flow of the intake air flow can be appropriately adjusted according to the number and arrangement of the second shaft through holes 202.

Figure 6:
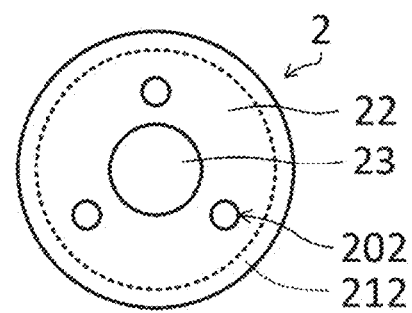
FIG. 6A illustrates a first arrangement example of second shaft through holes in a lid portion.
FIG. 6B illustrates a second arrangement example of the second shaft through holes in the lid portion.
FIG. 6C illustrates a third arrangement example of the second shaft through holes in the lid portion.
Figure 6:
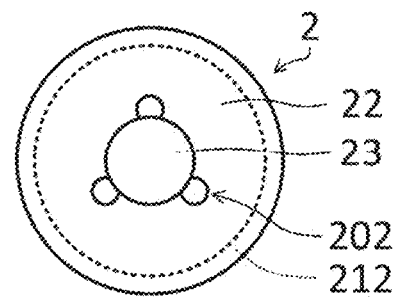
Figure 6:
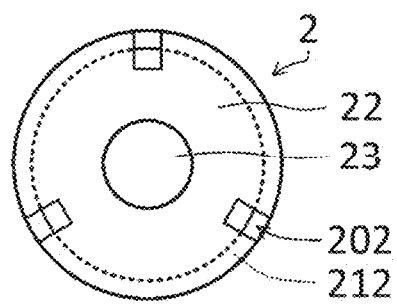

FIG. 6A illustrates a first arrangement example of the second shaft through holes 202 in the lid portion 22. FIG. 6B illustrates a second arrangement example of the second shaft through holes 202 in the lid portion 22. FIG. 6C illustrates a third arrangement example of the second shaft through holes 202 in the lid portion 22. At least some of the second shaft through holes 202 may be disposed between the radially outer end portion of the lid portion 22 and the second shaft 23 in the radial direction (see, for example, FIG. 6A). At least some of the second shaft through holes 202 may be disposed along the radially outer surface of the second shaft 23 (see, for example, FIG. 6B). At least some of the second shaft through holes 202 may be disposed along the radially outer end portion of the lid portion 22 (see, for example, FIG. 6C). Furthermore, the second shaft through hole 202 disposed along the radially outer end portion of the lid portion 22 may include a notch formed at the radially outer end portion of the lid portion 22 and a notch formed at one axial end portion of the first shaft 21.

Figure 7:
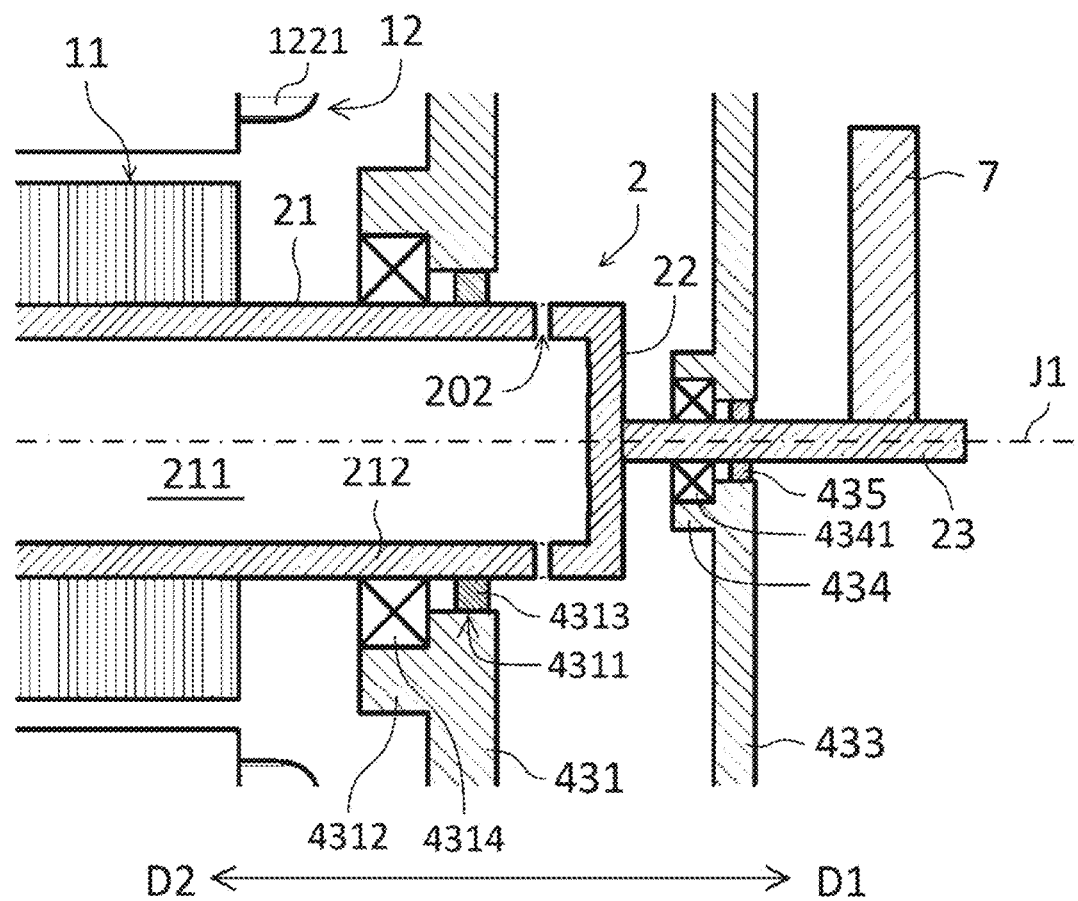
FIG. 7 illustrates an example of a second shaft through hole disposed in a first shaft.

However, the present invention is not limited to the above example, and the second shaft through hole 202 may be disposed in the first shaft 21 and penetrate the first shaft 21 in the radial direction. FIG. 7 illustrates an example of the second shaft through hole 202 disposed in the first shaft 21. As illustrated in FIG. 7, the second shaft through hole 202 may be disposed in the shaft tubular portion 212 and penetrates the shaft tubular portion 212 in the radial direction. Thus, the amount of intake air into the first shaft 21 can be further increased. In addition, if the number of the second shaft through holes 202 functioning as the intake ports is plural, the amount of intake air into the first shaft 21 and the flow of the intake air flow can be appropriately adjusted according to the number and arrangement of the second shaft through holes 202.

The number of the second shaft through holes 202 may be one or plural. In the latter case, the second shaft through holes 202 can be arranged at equal intervals or different intervals in the circumferential direction (see, for example, FIGS. 6A to 6C).

Next, the lid portion 22 will be described with reference to FIGS. 2 and 8 to 11. FIGS. 8 to 11 illustrate a first modification to a fourth modification of the lid portion 22, respectively.

Figure 8:
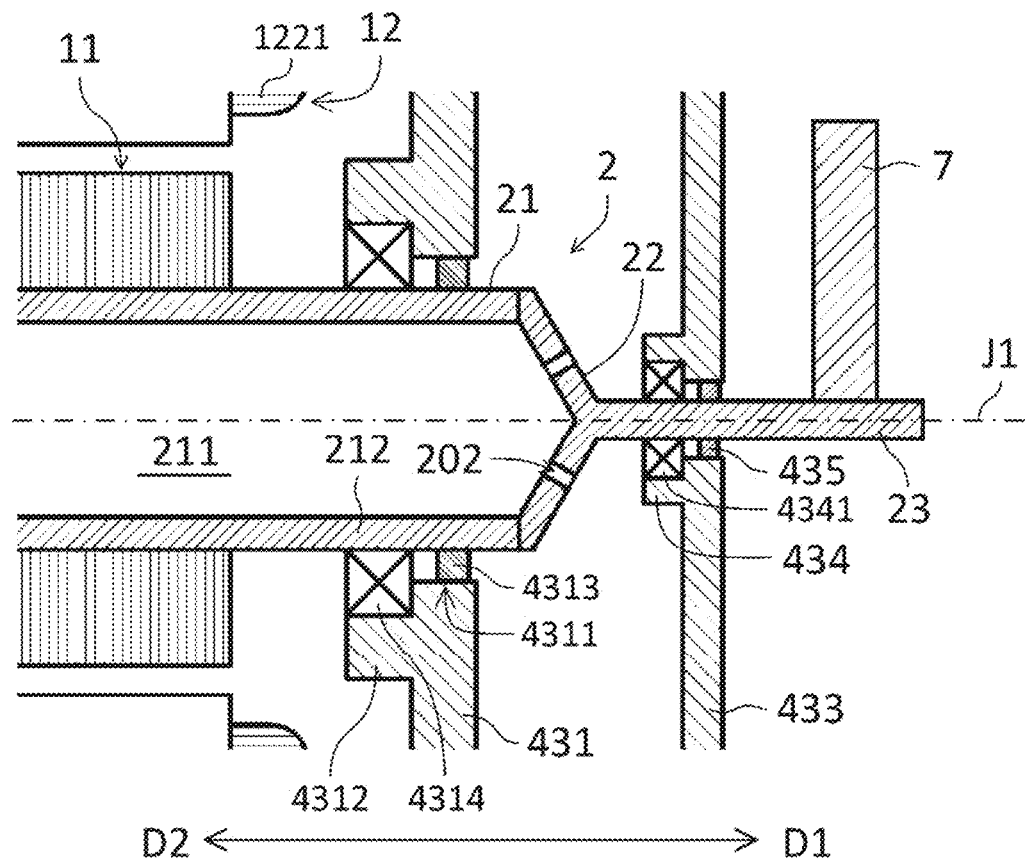
FIG. 8 is a first modification of the lid portion.
Figure 9:
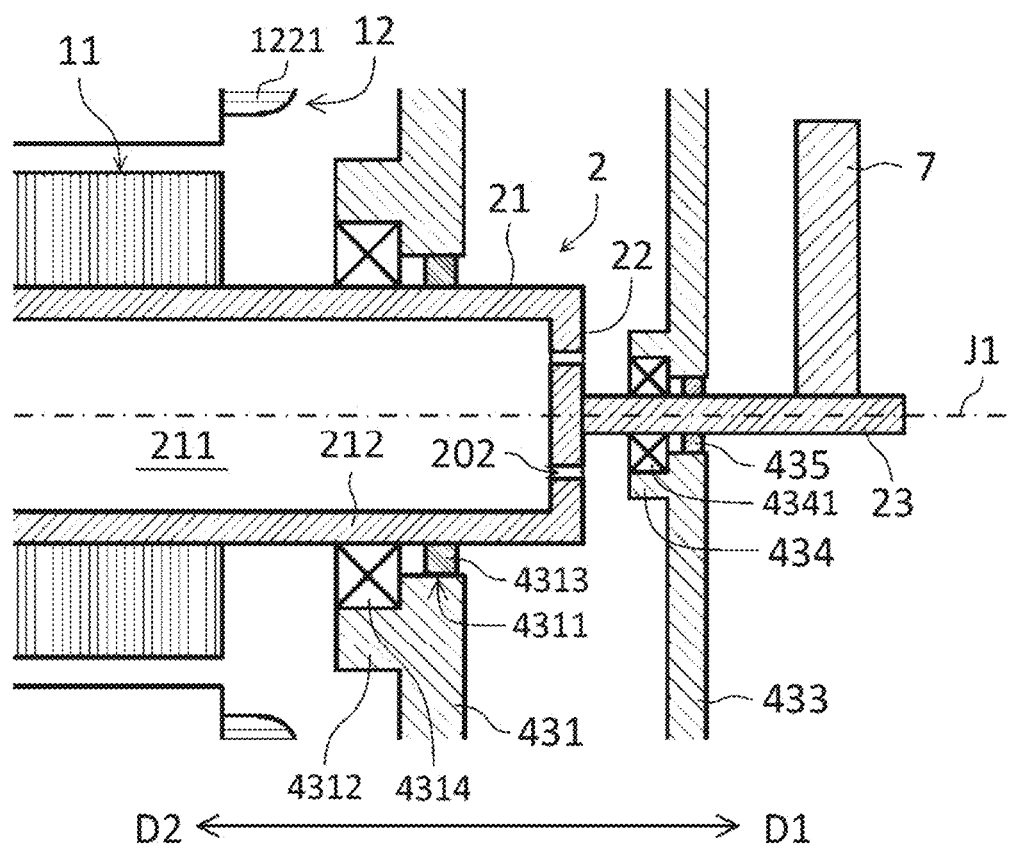
FIG. 9 is a second modification of the lid portion.

In the present embodiment, as illustrated in FIG. 2, the lid portion 22 has a plate shape expanding in the radial direction from the first rotation axis J1. However, the lid portion 22 is not limited to the example. FIG. 8 illustrates another shape of the lid portion 22. The shape of the lid portion 22 may be a shape other than the plate shape, and for example, as illustrated in FIG. 8, may be a conical shape expanding radially outward toward the one axial side D1 or the other axial side D2.

Preferably, the lid portion 22 is integrated with the first shaft 21. Alternatively, the lid portion 22 is integrated with the second shaft 23. For example, in the present embodiment, the lid portion 22 is a different part of the same member as the second shaft 23 (see FIG. 2), but may be a different part of the same member as the first shaft 21 (see FIG. 9). By integrating the lid portion 22 with the first shaft 21 or the second shaft 23, the shaft 2 is easily manufactured. In addition, since the number of components of the shaft 2 can be reduced, the motor 100 is easily assembled. However, this example does not exclude a configuration in which the lid portion 22 is a separate member from both the first shaft 21 and the second shaft 23.

Figure 10:
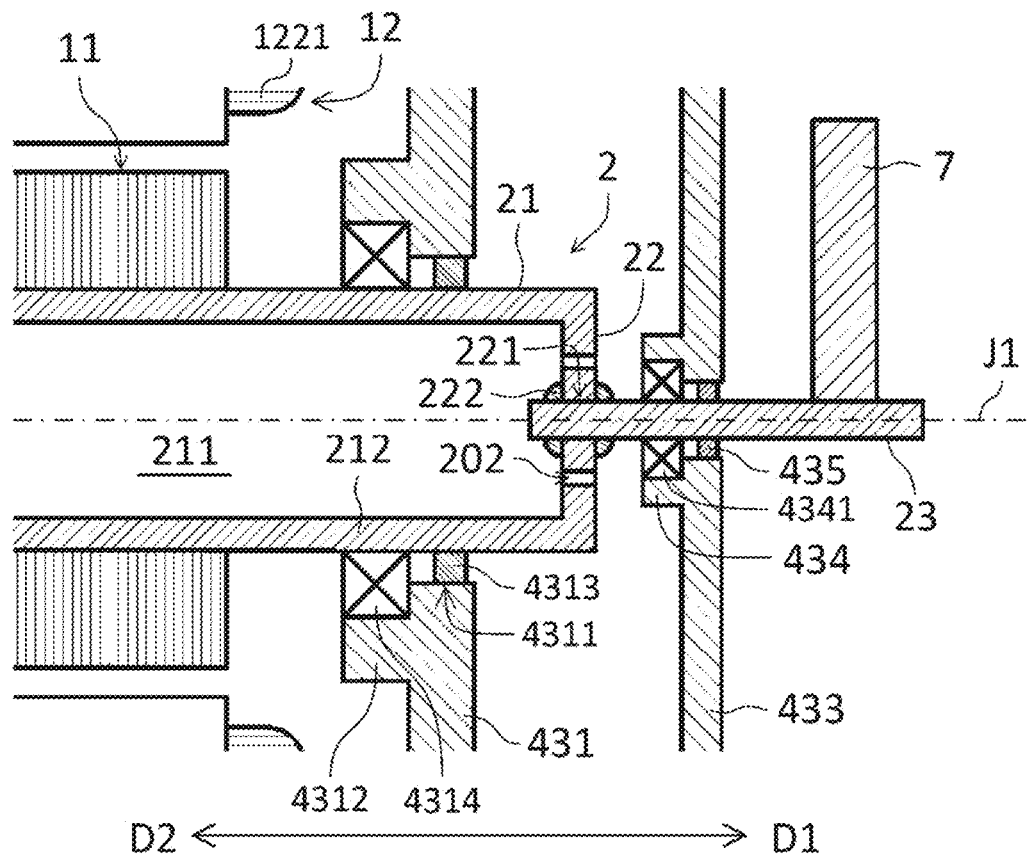
FIG. 10 is a third modification of the lid portion.

When the lid portion 22 is a member different from the second shaft 23, the lid portion 22 may have a hole 221 (see FIG. 10). The hole 221 is disposed in one axial end portion of the lid portion 22 and extends on the other axial side D2. The hole 221 may be a through hole penetrating the lid portion 22 in the axial direction as illustrated in FIG. 10, or may be a recess recessed from one axial end surface of the lid portion 22 on the other axial side D2. A portion of the second shaft 23 on the other axial side D2 is fitted into the hole 221. Thus, the second shaft 23 can be easily attached to the lid portion 22.

When the second shaft 23 is fitted into the hole 221, preferably, the shaft 2 further includes a first fixing portion 222. The first fixing portion 222 fixes the second shaft 23 to the lid portion 22 (see FIG. 10). For example, the first fixing portion 222 may be a brazing material (silver wax or the like) for brazing, may be an adhesive, or may be a welding mark. That is, the means for fixing the second shaft 23 to the lid portion 22 in the hole 221 may be brazing, bonding using an adhesive, or welding. Thus, the second shaft 23 can be more reliably held by the lid portion 22. Note that the first fixing portion 222 is not limited to these examples. For example, a male screw portion formed on the radially outer surface of the second shaft 23 may be screwed into a female screw portion formed on the inner surface of the hole 221, whereby both may be fixed. However, this example does not exclude a configuration in which the shaft 2 does not include the first fixing portion 222.

In the present embodiment, as illustrated in FIG. 2, the lid portion 22 is connected to one axial end portion of the shaft tubular portion 212 and covers an opening at one axial end portion of the shaft tubular portion 212. However, the lid portion 22 is not limited to the example. For example, the lid portion 22 may be disposed on one side in the radial direction with respect to the first shaft through hole 201, and may be disposed inside the shaft tubular portion 212 at a portion on the one axial side D1 of the shaft tubular portion 212 (see FIG. 11). In other words, the lid portion 22 may be fitted to one axial end portion of the first shaft 21. By fitting the lid portion 22 into the first shaft 21, the second shaft 23 can be attached to the first shaft 21. Therefore, the axial length of the shaft 2 can be adjusted.

Figure 11:
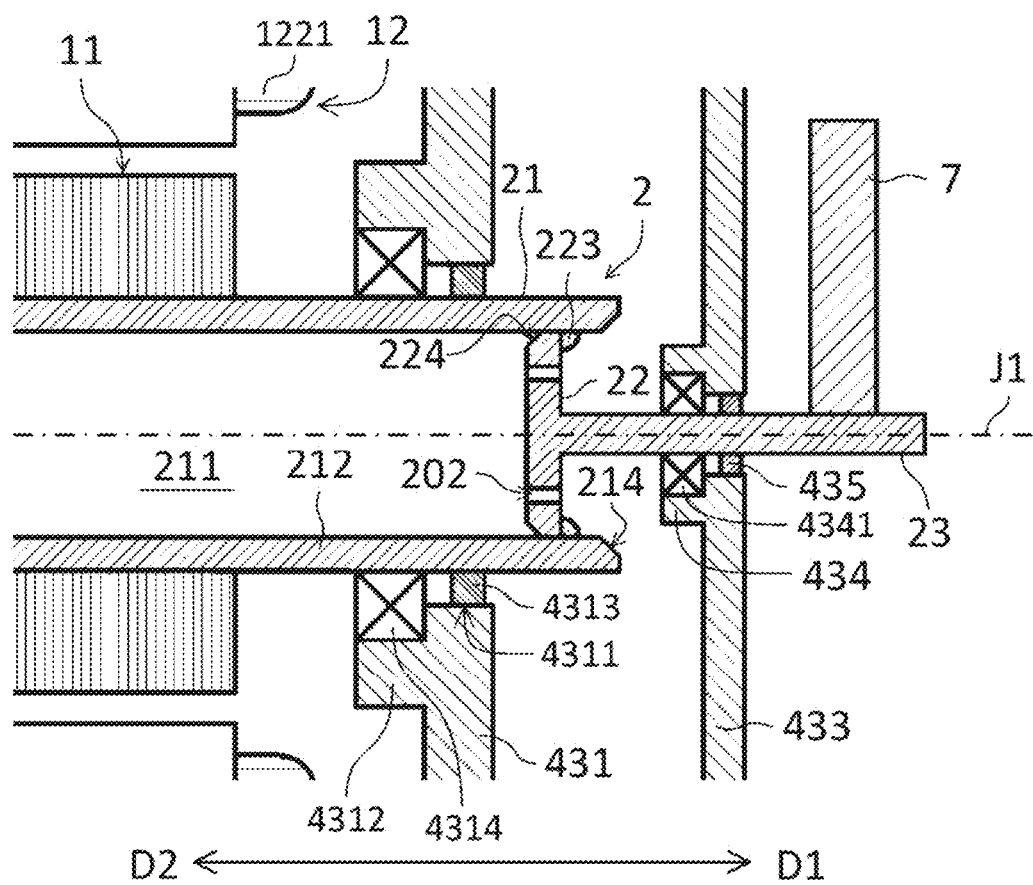
FIG. 11 is a fourth modification of the lid portion.

In addition, when the lid portion 22 is fitted to the first shaft 21, preferably, for example, as illustrated in FIG. 11, the shaft 2 further includes a second fixing portion 223. The second fixing portion 223 fixes the lid portion 22 to the first shaft 21. For example, the second fixing portion 223 may be a brazing material (silver wax or the like) for brazing, may be an adhesive, or may be a welding mark. That is, the means for fixing the lid portion 22 to the first shaft 21 on the one axial side D1 side in the shaft tubular portion 212 may be brazing, bonding using an adhesive, or welding. Thus, the first shaft 21 can more reliably hold the lid portion 22. The second fixing portion 223 is not limited to these examples. For example, a male screw portion formed on the radially outer surface of the second shaft 23 may be screwed into a female screw portion formed on the inner surface of the hole 221, whereby both may be fixed. However, this example does not exclude a configuration in which the shaft 2 does not include the second fixing portion 223.

Preferably, when the lid portion 22 is fitted to the first shaft 21, the lid portion 22 further includes a first chamfered portion 224 (see FIG. 11). The first chamfered portion 224 is disposed in the radially outer end portion of the other axial end portion of the lid portion 22. For example, at the other axial end portion of the lid portion 22, a corner portion formed by the other axial end surface of the lid portion 22 and the radially outer surface is subjected to so-called round chamfering (R-chamfering) for forming a curved surface therebetween or so-called beveling (C-chamfering) for cutting off the corner portion obliquely over the circumferential direction. With the arrangement of the first chamfered portion 224, the lid portion 22 is further easily fitted to one axial end portion of the first shaft 21. Therefore, the first shaft 21 and the lid portion 22 can be more easily attached to the one axial end portion of the first shaft 21. However, this example does not exclude a configuration in which the lid portion 22 does not have the first chamfered portion 224.

Figure 12:
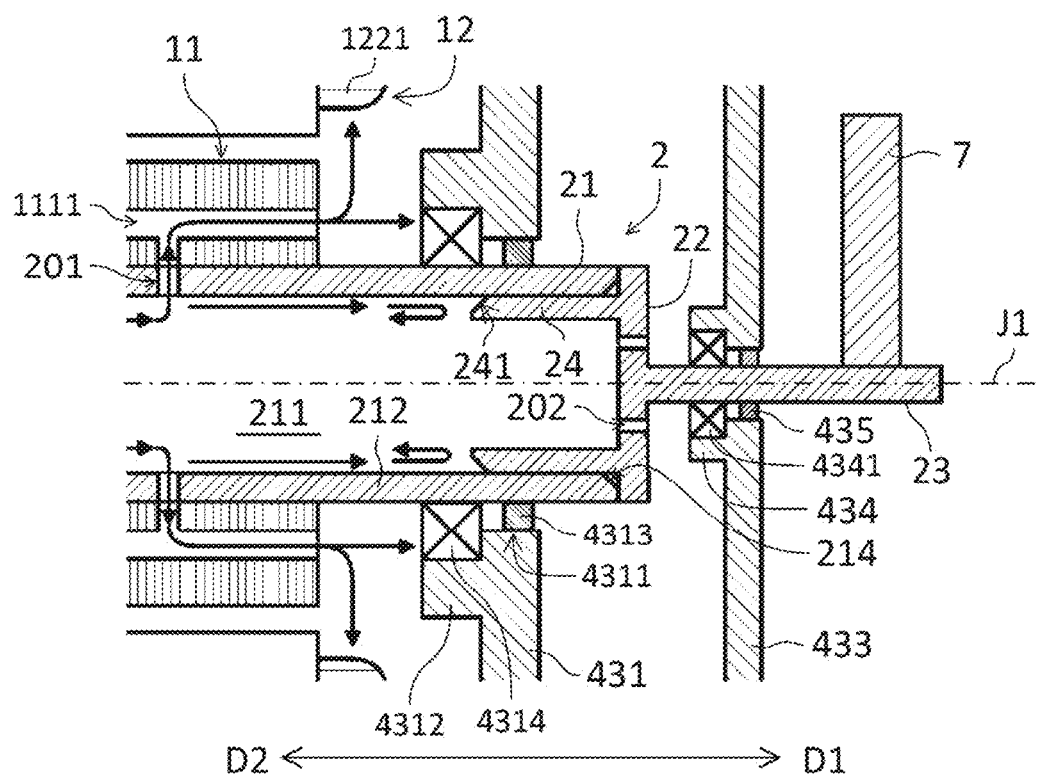
FIG. 12 is a first modification of the shaft.
Figure 13:
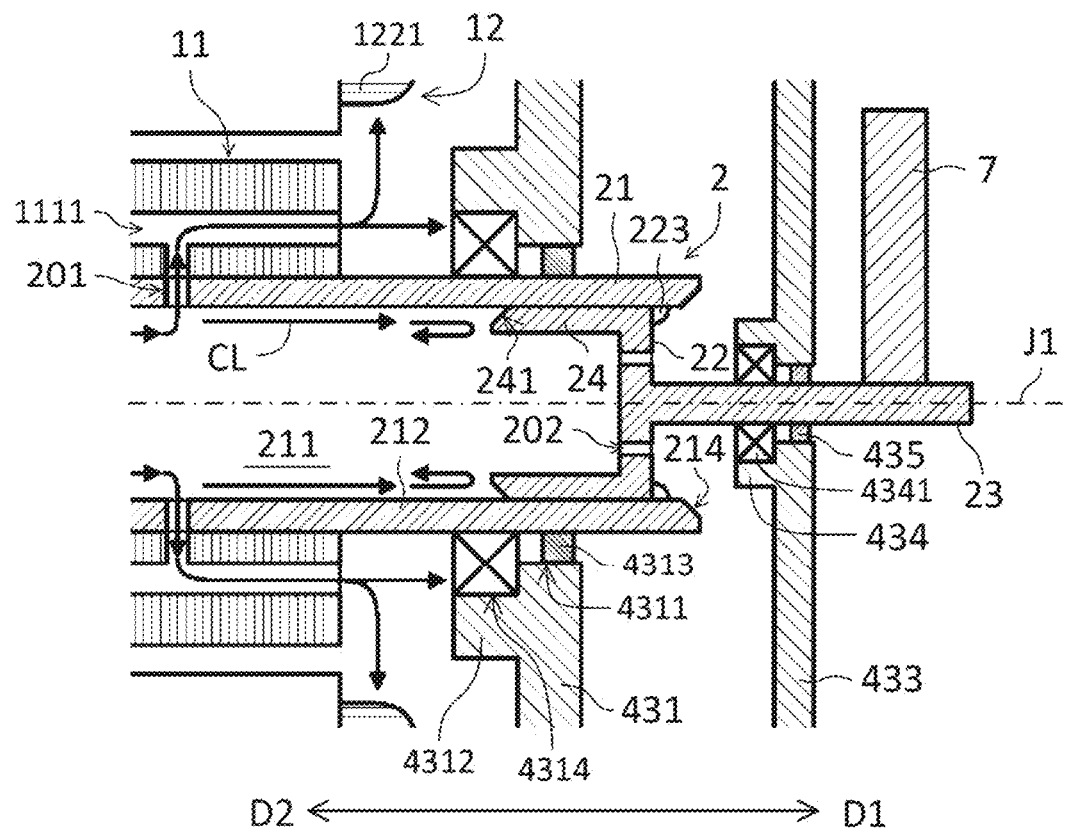
FIG. 13 is a second modification of the shaft.
Figure 14:
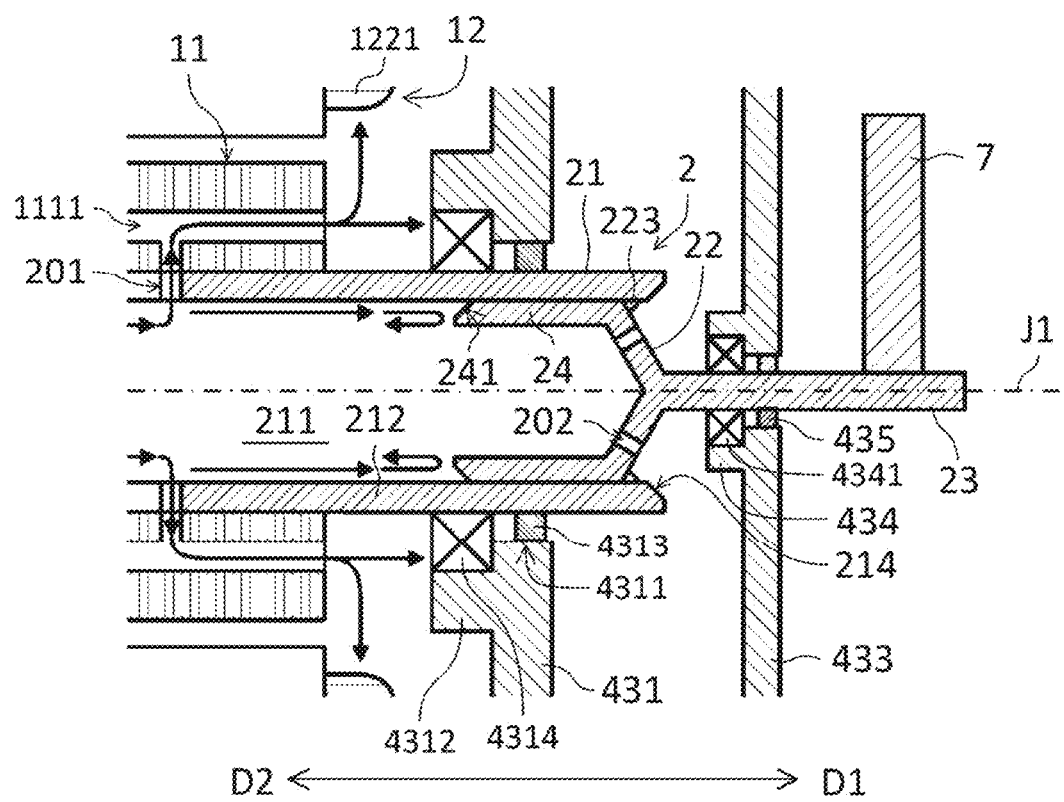
FIG. 14 is a third modification of the shaft.

Next, another modification of the shaft 2 will be described with reference to FIGS. 12 to 14. FIGS. 12 to 14 illustrate a first modification to a third modification of the shaft 2, respectively.

As illustrated in FIGS. 12 to 14, the shaft 2 may further include a tubular lid tubular portion 24. The lid tubular portion 24 extends on the other axial side D2 from the other axial end portion of the lid portion 22. An outer peripheral surface of the lid tubular portion 24 is in contact with an inner peripheral surface of one axial end portion of the first shaft 21. For example, as illustrated in FIG. 12, the lid tubular portion 24 may extend on the other axial side D2 from the lid portion 22 that closes one axial end portion of the shaft tubular portion 212. As illustrated in FIG. 13, the lid tubular portion 24 may extend on the other axial side D2 from the lid portion 22 fitted to the one axial side D1 side of the shaft tubular portion 212. As illustrated in FIG. 14, for example, the lid tubular portion 24 may extend on the other axial side D2 from the conical lid portion 22 expanding radially outward toward the one axial side D1 or the other axial side D2. When the lid portion 22 is attached to the first shaft 21, the lid portion 22 is hardly inclined with respect to the axial direction by the lid tubular portion 24, so that the attachment accuracy of the lid portion 22 and the second shaft 23 with respect to the first shaft 21 can be improved. Therefore, for example, the deviation between the rotation center of the second shaft 23 and the rotation center of the first shaft 21 can be suppressed or prevented. Further, when the refrigerant such as the lubricant CL flows inside the first shaft 21, the lid tubular portion 24 can prevent the refrigerant flowing along the inner peripheral surface of the first shaft 21 due to the rotation of the shaft 2 from reaching one axial end portion of the first shaft 21. Therefore, the refrigerant is less likely to leak from the one axial end portion of the first shaft 21.

Preferably, the lid tubular portion 24 includes a second chamfered portion 241. The second chamfered portion 241 is disposed in the other axial end portion of the outer peripheral surface of the lid tubular portion 24 (see FIGS. 12 to 14). For example, at the other axial end portion of the lid tubular portion 24, a corner portion formed by the outer peripheral surface of the lid tubular portion 24 and the other axial end surface is subjected to so-called round chamfering (R-chamfering) for forming a curved surface therebetween or so-called beveling (C-chamfering) for cutting off the corner portion obliquely in the circumferential direction. Due to the arrangement of the second chamfered portion 241, the lid tubular portion 24 is easily fitted to one axial end portion of the first shaft 21. Therefore, the lid portion 22 can be easily attached to the one axial end portion of the first shaft 21. However, this example does not exclude a configuration in which the lid portion 22 does not include the second chamfered portion 241.

In addition, the first shaft 21 may further include a third chamfered portion 214. The third chamfered portion 214 is disposed in one axial end portion of the inner peripheral surface of the first shaft 21. This configuration is particularly effective for a configuration in which the lid portion 22 is fitted to the first shaft 21 (see, for example, FIGS. 11 and 13 to 14), a configuration in which the shaft 2 has the lid tubular portion 24 (see, for example, FIGS. 11 and 14), and the like. For example, at one axial end portion of the first shaft 21, a corner portion formed by the inner peripheral surface of the first shaft 21 and one axial end surface is subjected to so-called round chamfering (R-chamfering) for forming a curved surface therebetween or so-called beveling (C-chamfering) for cutting off the corner portion obliquely in the circumferential direction. Due to the arrangement of the third chamfered portion 214, the member is easily fitted to one axial end portion of the first shaft 21. For example, the lid portion 22 or the lid tubular portion 24 described later can be easily fitted to one axial end portion of the first shaft 21 (see FIGS. 11 to 14 described later). Therefore, members such as the lid portion 22 and the lid tubular portion 24 can be easily attached to one axial end portion of the first shaft 21. However, this example does not exclude a configuration in which the first shaft 21 does not include the third chamfered portion 214.

Next, details of the power transmission device 3 will be described with reference to FIG. 1. The power transmission device 3 transmits the power of the motor unit 1 to the output shaft Ds. The power transmission device 3 includes a speed reduction device 31 and a differential device 32.

The speed reduction device 31 is connected to the shaft 2. The speed reduction device 31 has a function of reducing the rotation speed of the motor unit 1 and increasing torque output from the motor unit 1 according a reduction ratio. The speed reduction device 31 transmits the torque output from the motor unit 1 to the output shaft Ds. That is, the power transmission device 3 is connected to the other axial side D2 of the shaft 2 that rotates about the first rotation axis J1 extending along the horizontal direction.

The speed reduction device 31 includes a main drive gear 311, an intermediate driven gear 312, a final drive gear 313, and an intermediate shaft 314. The torque output from the motor unit 1 is transmitted to a ring gear 321 of the output shaft Ds via the shaft 2, the main drive gear 311, the intermediate driven gear 312, the intermediate shaft 314, and the final drive gear 313.

The main drive gear 311 is disposed on the outer peripheral surface of the shaft 2. The main drive gear 311 may be the same member as the shaft 2, or may be another member and be firmly fixed. The main drive gear 311 rotates about the first rotation axis J1 together with the shaft 2.

The intermediate shaft 314 is arranged to extend along a second rotation axis J2 parallel to the first rotation axis J1. Both ends of the intermediate shaft 314 are rotatably supported about the second rotation axis J2 by a first intermediate bearing 4231 and a second intermediate bearing 4621. The intermediate driven gear 312 and the final drive gear 313 are disposed on an outer peripheral surface of the intermediate shaft 314. The intermediate driven gear 312 may be the same member as the intermediate shaft 314, or may be another member and be firmly fixed.

The intermediate driven gear 312 and the final drive gear 313 rotate integrally with the intermediate shaft 314 about the second rotation axis J2. The intermediate driven gear 312 meshes with the main drive gear 311. The final drive gear 313 meshes with the ring gear 321 of the output shaft Ds.

The torque of the shaft 2 is transmitted from the main drive gear 311 to the intermediate driven gear 312. The torque transmitted to the intermediate driven gear 312 is transmitted to the final drive gear 313 via the intermediate shaft 314. Furthermore, the torque is transmitted from the final drive gear 313 to the output shaft Ds.

The differential device 32 is attached to the output shaft Ds. The differential device 32 includes the ring gear 321. The ring gear 321 transmits the output torque of the motor unit 1 to the output shaft Ds. The output shaft Ds has axles Ds1 and Ds2 respectively attached to the left and right of the differential device 32. For example, the differential device 32 transmits torque to the left and right axles Ds1 and Ds2 while absorbing the rotational speed difference between the left and right axles when the vehicle turns.

The lower end portion of the ring gear 321 is disposed inside a liquid storage portion P described later in which the lubricant CL and the like stored in the lower portion of the gear portion accommodation space 402 are stored (see FIG. 1). Thus, when the first gear 331 rotates, the lubricant CL is scraped up by gear teeth of the ring gear 321. The gears and bearings of the power transmission device 3 are lubricated or cooled by the lubricant CL scraped up by the ring gear 321. A part of the scraped lubricant CL is stored in a tray portion 464 described later, and is also used for cooling the motor unit 1 via the shaft 2.

Next, details of the housing 4 will be described with reference to FIGS. 1 and 2. The housing 4 includes a first housing tubular portion 41, a side plate portion 42, a motor lid portion 43, a cover member 44, a second housing tubular portion 45, and a gear lid portion 46. The first housing tubular portion 41, the side plate portion 42, the motor lid portion 43, the second housing tubular portion 45, and the gear lid portion 46 are formed using, for example, a conductive material, and in the present embodiment, are formed using a metal material such as iron, aluminum, or an alloy thereof. In addition, in order to suppress contact corrosion of dissimilar metals at the contact portion, these are preferably formed using the same material. However, the present invention is not limited to this example, and these materials may be formed using materials other than metal materials, or at least a part of these materials may be formed using different materials.

As described above, the housing 4 accommodates the rotor 11, the stator 12, the bearings 4211 and 4314, and the like of the motor unit 1. Specifically, the housing 4 has a motor accommodation space 401. The motor accommodation space 401 is a space surrounded by the first housing tubular portion 41, the side plate portion 42, and the motor lid portion 43, and accommodates the rotor 11, the stator 12, the bearings 4211 and 4314, and the like.

The housing 4 accommodates the power transmission device 3. Specifically, the housing 4 includes the gear portion accommodation space 402. The gear portion accommodation space 402 is a space surrounded by the side plate portion 42, the second housing tubular portion 45, and the gear lid portion 46, and accommodates the speed reduction device 31, the differential device 32, and the like.

The liquid storage portion P in which the lubricant CL is stored is disposed in a lower portion in the gear portion accommodation space 402. A portion of the differential device 32 soaks in the liquid storage portion P. The lubricant CL stored in the liquid storage portion P is scraped up by the operation of the differential device 32 and supplied into the gear portion accommodation space 402. That is, the lubricant CL is scraped up by a tooth surface of the ring gear 321 when the ring gear 321 of the differential device 32 rotates.

A part of the scraped lubricant CL is supplied to each gear and each bearing of the speed reduction device 31 and the differential device 32 in the gear portion accommodation space 402 and used for lubrication. In addition, the other part of the scraped lubricant CL is supplied to the inside of the shaft 2, and is supplied to the rotor 11 and the stator 12 of the motor unit 1 and the bearings in the gear portion accommodation space 402 to be used for cooling and lubrication.

The first housing tubular portion 41 has a tubular shape that extends in the axial direction. The motor unit 1, a motor oil reservoir 64 described later, and the like are disposed inside the first housing tubular portion 41. The stator core 121 is fixed to the inner surface of the first housing tubular portion 41.

The side plate portion 42 extends in a direction perpendicular to the first rotation axis J1 and covers the other axial end portion of the first housing tubular portion 41. In the present embodiment, the first housing tubular portion 41 and the side plate portion 42 are different parts of a single member. By integrally forming both of them, rigidity of them can be enhanced. However, the present invention is not limited to this example, and the first housing tubular portion 41 and the side plate portion 42 may be separate members.

The side plate portion 42 has a side plate through hole 4201 through which the shaft 2 is inserted and a first output shaft through hole 4202. The side plate through hole 4201 and the first output shaft through hole 4202 penetrates the side plate portion 42 in the axial direction. The first shaft 21 is inserted into the side plate through hole 4201. One axle Ds1 of the output shaft Ds is inserted into the first output shaft through hole 4202. An oil seal (not illustrated) is disposed in a gap between the output shaft Ds and the first output shaft through hole 4202 to seal both. The term "seal" means that different members are in close contact with each other to such an extent that the lubricant CL inside the members does not leak to the outside and to such an extent that foreign matters such as external water, dust, and dust do not enter. The same applies for sealing.

The side plate portion 42 further includes bearing holding portions 421, 422, 423, and 424. The bearing holding portion 421 is disposed on one axial end surface of the side plate portion 42 in the motor accommodation space 401 and holds the bearing 4211. The bearing holding portions 422, 423, and 424 are disposed on the other axial end surface of the side plate portion 42 in the gear portion accommodation space 402 described later. The bearing holding portion 422 is disposed along the outer edge portion of the other axial end portion of the side plate through hole 4201 and holds the bearing 4211. The bearing holding portion 423 holds the first intermediate bearing 4231. The bearing holding portion 424 is disposed along the outer edge portion of the other axial end portion of the first output shaft through hole 4202 and holds a first output bearing 4241.

The motor lid portion 43 is attached to one axial end portion of the first housing tubular portion 41. The motor lid portion 43 can be fixed to the first housing tubular portion 41 by, for example, a screw, but is not limited thereto, and a method of firmly fixing the plate portion 433 to the first housing tubular portion 41, such as screwing or press-fitting, can be widely adopted. As a result, the motor lid portion 43 can be brought into close contact with one axial end portion of the first housing tubular portion 41. The term "close contact" means sealability to an extent that the lubricant CL inside the member does not leak to the outside and to an extent that foreign matters such as external water, dirt, and dust do not enter. The same applies for adhesion.

As illustrated in FIG. 2, the motor lid portion 43 includes a lid portion 431, a tubular portion 432, a plate portion 433, and a bearing holding portion 434. In other words, the housing 4 includes the lid portion 431, the tubular portion 432, and the plate portion 433.

The lid portion 431 extends in a direction intersecting the first rotation axis J1 and covers one axial end portion of the first housing tubular portion 41. The lid portion 431 includes an opening 4311 through which the shaft 2 is inserted. The opening 4311 penetrates the lid portion 431 in the axial direction. The first shaft 21 is inserted into the opening 4311. The lid portion 431 further includes a bearing holding portion 4312 and a seal member 4313. The bearing holding portion 4312 is disposed on the other axial end surface of the lid portion 431 in the motor accommodation space 401. The bearing holding portion 4312 is disposed along an outer edge portion of the other axial end portion of the opening 4311 and holds the bearing 4314. The seal member 4313 is disposed between the first shaft 21 and the lid portion 431 in the opening 4311 to seal both. By sealing the opening 4311 with the seal member 4313, for example, foreign matter such as wear debris generated in the electrical discharging device 7 can be prevented from entering the motor accommodation space 401 in which the stator 12 and the like are accommodated through the opening 4311.

The tubular portion 432 has a tubular shape surrounding the first rotation axis J1 and extends on the one axial side D1 from the one axial end surface of the lid portion 431.

The plate portion 433 extends in a direction intersecting the first rotation axis J1 and is attached to the one axial end portion of the tubular portion 432. The plate portion 433 has conductivity. As mentioned earlier, the housing 4 includes the plate portion 433. In the present embodiment, the plate portion 433 is disposed on the one axial side D1 with respect to the stator 12 and a bearing 4341 described later and expands in the radial direction. An opening 4331 through which the second shaft 23 is inserted is disposed in the plate portion 433. In other words, the plate portion 433 includes the opening 4331. The opening 4331 penetrates the plate portion 433 in the axial direction. The electrical discharging device 7 is disposed in one axial end portion of the plate portion 433.

The bearing holding portion 434 is disposed along an outer edge portion of one axial end portion of the opening 4331 on the other axial end surface of the plate portion 433 and holds the bearing 4341.

The seal member 435 is disposed in the opening 4331 of the plate portion 433. The motor 100 includes an annular seal member 435. The seal member 435 is disposed between the second shaft 23 and the plate portion 433 in the opening 4331 to seal both. The radially outer end portion of the seal member 435 is in contact with the inner peripheral surface of the opening 4331 facing radially inward. The radially inner end portion of the seal member 435 is in contact with the radially outer surface of the second shaft 23. By sealing the opening 4331 with the seal member 435, it is possible to prevent wear debris generated from the electrical discharging device 7 disposed in one axial end surface of the plate portion 433 from entering the other axial side with respect to the plate portion 433 through the opening 4331. Therefore, wear debris can be prevented from entering the inside of the housing 4 in which the stator 12 and the like are accommodated. For example, wear debris can also be prevented from entering the hollow portion 211 of the first shaft 21 via the second shaft through hole 202. Therefore, wear debris can be prevented from entering the motor accommodation space 401 along with the flow of the lubricant CL in the hollow portion 211.

The cover member 44 is disposed in one axial end surface of the plate portion 433. The cover member 44 covers the opening 4331 and the electrical discharging device 7.

Attachment of the cover member 44 to the plate portion 433 may be, for example, screwing, but is not limited thereto. In the present embodiment, the cover member 44 forms an accommodation space 440 together with the plate portion 433. The accommodation space 440 is a space surrounded by the cover member 44 and the plate portion 433, and accommodates the opening 4331 and the electrical discharging device 7.

The cover member 44 includes a first cover portion 441 and a second cover portion 442. The first cover portion 441 covers the electrical discharging device 7. The second cover portion 442 is disposed radially outward of the first cover portion 441. Specifically, the first cover portion 441 and the second cover portion 442 spread in a direction intersecting the first rotation axis J1. The first cover portion 441 is disposed on the one axial side D1 with respect to the opening 4331 and the electrical discharging device 7. The second cover portion 442 is disposed on the other axial side D2 with respect to the first cover portion 441. The radially inner end portion of the second cover portion 442 is connected to the radially outer end portion of the first cover portion 441, and the radially outer end portion of the second cover portion 442 is connected to one axial end surface of the plate portion 433.

The cover member 44 includes a through hole 443, a tubular portion 444, and a filter 445. The through hole 443 connects the accommodation space 440 and the outside thereof. The through hole 443 is disposed in the first cover portion 441 in FIG. 1. However, the arrangement of the through hole 443 is not limited to the example of FIG. 1. The through hole 443 can be disposed in at least one of the first cover portion 441 and the second cover portion 442. The tubular portion 444 extends in the axial direction from the outer edge portion of the through hole 443. The inside of the tubular portion 444 is connected to the through hole 443. The filter 445 is attached to the tip of the tubular portion 444. The accommodation space 440 is connected to the outside via the through hole 443 and the filter 445.

The second housing tubular portion 45 has a tubular shape that extends in the axial direction. The power transmission device 3 is disposed inside the second housing tubular portion 45. The one axial end portion of the second housing tubular portion 45 is connected to the side plate portion 42 and covered with the side plate portion 42.

The gear lid portion 46 extends in a direction intersecting the first rotation axis J1 and is detachably attached to other axial end portion of the second housing tubular portion 45. In the present embodiment, the second housing tubular portion 45 and the gear lid portion 46 are different parts of a single member. However, the present invention is not limited to this example, and the second housing tubular portion 45 and the gear lid portion 46 may be separate members. Further, the attachment of the gear lid portion 46 to the second housing tubular portion 45 may be, for example, fixing with a screw, but is not limited thereto, and a method of firmly fixing the gear lid portion 46 to the second housing tubular portion 45, such as screwing or press-fitting, can be widely adopted. As a result, the gear lid portion 46 can be brought into close contact with other axial end portion of the second housing tubular portion 45.

The gear lid portion 46 includes a second output shaft through hole 460. The center of the second output shaft through hole 460 coincides with a third rotation axis J3. The output shaft Ds is inserted into the second output through hole 460. An oil seal (not illustrated) is disposed in a gap between the output shaft Ds on the other side and the second output shaft through hole 460.

The gear lid portion 46 further includes bearing holding portions 461, 462, and 463. The bearing holding portions 461, 462, and 463 are disposed in the one axial end surface of the gear lid portion 46 in the gear portion accommodation space 402. The bearing holding portion 461 holds the bearing 4611. The bearing holding portion 462 holds the second intermediate bearing 4621. The bearing holding portion 463 is disposed along the outer edge portion of the one axial end portion of the second output shaft through hole 460 and holds a second output bearing 4631.

The gear lid portion 46 includes the tray portion 464 and the oil passage 465. The tray portion 464 is disposed in one axial end surface of the gear lid portion 46 and has a recess recessed vertically downward. The tray portion 464 can store the lubricant CL scraped up by the ring gear 321. The oil passage 465 is a passage for the lubricant CL and connects the tray portion 464 and the inlet 213 of the shaft 2. The lubricant CL stored in the tray portion 464 is supplied to the oil passage 465 and flows into the hollow portion 211 from the inlet 213 at the other axial end portion of the shaft 2.

Next, the liquid circulation portion 6 will be described. The liquid circulation portion 6 includes a pipe portion 61, a pump 62, an oil cooler 63, and a motor oil reservoir 64.

The pipe portion 61 connects the pump 62 and the motor oil reservoir 64 disposed inside the first housing tubular portion 41, and supplies the lubricant CL to the motor oil reservoir 64. The pump 62 sucks the lubricant CL stored in the lower region of the gear portion accommodation space 402. The pump 62 is an electric pump, but is not limited thereto. For example, a part of the power of the shaft 2 of the motor 100 may be used for driving.

The oil cooler 63 is disposed between the pump 62 of the pipe portion 61 and the motor oil reservoir 64. That is, the lubricant CL sucked by the pump 62 passes through the oil cooler 63 via the pipe portion 61, and is sent to the motor oil reservoir 64. For example, a refrigerant such as water supplied from the outside is supplied to the oil cooler 63. The oil cooler 63 exchanges heat between the refrigerant and the lubricant CL to lower a temperature of the lubricant CL.

The motor oil reservoir 64 is a tray disposed on the vertically upper side with respect to the stator 12 inside the motor accommodation space 401. A dropping hole is formed in a bottom portion of the motor oil reservoir 64, and the motor unit 1 is cooled by dropping the lubricant CL from the dropping hole. The dropping hole is formed, for example, at an upper portion of the coil end 1221 of the coil portion 122 of the stator 12, and the coil portion 122 is cooled by the lubricant CL.

The embodiment of the present invention has been described above. Note that, the scope of the present invention is not limited to the above-described embodiment. The present invention can be implemented by making various modifications to the above-described embodiment without departing from the gist of the invention. In addition, the matters described in the above-described embodiment can be discretionarily combined together as appropriate within a range where no inconsistency occurs.

The present invention is useful for a device for grounding a shaft.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A motor comprising:
   a shaft having a first shaft having a tubular shape extending in an axial direction;
   a rotor supported by the first shaft and rotatable together with the shaft;
   a stator disposed radially outward of the rotor;
   a bearing that rotatably supports the first shaft;
   a housing that accommodates the rotor, the stator, and the bearing; and
   an electrical discharging device that electrically connects the shaft and the housing,
   wherein the shaft further includes:
   a lid portion disposed in one axial end portion of the first shaft;
   a second shaft extending from the lid portion on one axial side;
   a first shaft through hole radially penetrating the first shaft; and
   a second shaft through hole communicating with an inside of the first shaft and an external space of the shaft,
   wherein the lid portion and the second shaft have conductivity, and
   wherein the second shaft through hole is disposed on one axial side with respect to the first shaft through hole, and
   wherein the second shaft is in contact with the electrical discharging device.

2. The motor according to claim 1,
   wherein an outer diameter of the second shaft is smaller than an outer diameter of the first shaft, and
   wherein the electrical discharging device is in contact with at least a partial region in a circumferential direction of a radially outer surface of the second shaft.

3. The motor according to claim 1, wherein the second shaft through hole is disposed in the first shaft and penetrates the first shaft in a radial direction.

4. The motor according to claim 1, wherein the second shaft through hole is disposed in the lid portion and penetrates the lid portion in an axial direction.

5. The motor according to claim 1, wherein the lid portion is integrated with the first shaft.

6. The motor according to claim 1, wherein the lid portion is integrated with the second shaft.

7. The motor according to claim 1,
   wherein the lid portion has a hole disposed in one axial end portion of the lid portion and extending on an other axial side,
   wherein the second shaft is a member different from the lid portion, and
   wherein a portion on an other axial side of the second shaft is fitted into the hole.

8. The motor according to claim 7, wherein the shaft further includes a first fixing portion that fixes the second shaft to the lid portion.

9. The motor according to claim 1, wherein the lid portion is fitted to one axial end portion of the first shaft.

10. The motor according to claim 9,
wherein the shaft further includes a second fixing portion that fixes the lid portion to the first shaft.

11. The motor according to claim 9,
wherein the lid portion further includes a first chamfered portion, and
wherein the first chamfered portion is disposed in a radially outer end portion of the other axial end portion of the lid portion.

12. The motor according to claim 1,
wherein the shaft further includes a lid tubular portion having a tubular shape extending on the other axial side from the other axial end portion of the lid portion, and
wherein an outer peripheral surface of the lid tubular portion is in contact with an inner peripheral surface of one axial end portion of the first shaft.

13. The motor according to claim 12,
wherein the lid tubular portion includes a second chamfered portion, and
wherein the second chamfered portion is disposed in an other axial end portion of an outer peripheral surface of the lid tubular portion.

14. The motor according to claim 1,
wherein the first shaft further includes a third chamfered portion, and
wherein the third chamfered portion is disposed in one axial end portion of an inner peripheral surface of the first shaft.

15. The motor according to claim 1, further comprising:
a seal member having an annular shape,
wherein the housing includes a plate portion that is disposed on one axial side with respect to the bearing and expands in a radial direction,
wherein an opening through which the second shaft is inserted is disposed in the plate portion,
wherein the seal member is disposed in the opening of the plate portion,
wherein the electrical discharging device is disposed in one axial end portion of the plate portion,
wherein a radially outer end portion of the seal member is in contact with an inner peripheral surface of the opening facing radially inward, and
wherein a radially inner end portion of the seal member is in contact with a radially outer surface of the second shaft.

16. The motor according to claim 1, further comprising a refrigerant flowing inside the first shaft.

* * * * *